United States Patent
Whaley

(10) Patent No.: US 8,268,911 B2
(45) Date of Patent: Sep. 18, 2012

(54) BIMODAL FILLER SYSTEMS FOR ENHANCED FLAME RETARDANCY

(75) Inventor: Paul D. Whaley, Hillsborough, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 204 days.

(21) Appl. No.: 12/678,522

(22) PCT Filed: Sep. 19, 2008

(86) PCT No.: PCT/US2008/077063
§ 371 (c)(1),
(2), (4) Date: Mar. 17, 2010

(87) PCT Pub. No.: WO2009/045760
PCT Pub. Date: Apr. 9, 2009

(65) Prior Publication Data
US 2010/0197828 A1    Aug. 5, 2010

Related U.S. Application Data

(60) Provisional application No. 60/975,871, filed on Sep. 28, 2007.

(51) Int. Cl.
*C08K 7/00* (2006.01)

(52) U.S. Cl. ........................ 523/220; 523/351

(58) Field of Classification Search ............... 523/220, 523/351
See application file for complete search history.

(56) References Cited

U.S. PATENT DOCUMENTS

| 3,225,018 | A | 12/1965 | Zutty |
| 3,646,155 | A | 2/1972 | Scott |
| 4,574,133 | A | 3/1986 | Umpleby |
| 6,331,597 | B1 | 12/2001 | Drumright et al. |
| 6,420,485 | B1 | 7/2002 | Suzuki et al. |

FOREIGN PATENT DOCUMENTS

| EP | 0 434 115 A1 | 6/1991 |
| EP | 1 285 772 A1 | 2/2003 |
| WO | 01/83593 A2 | 11/2001 |
| WO | 2006/026256 A1 | 3/2006 |

OTHER PUBLICATIONS

B E Clements et al., Modelling Simul. Mater. Sci. Eng. 12 (2004) 407-421.

*Primary Examiner* — Edward Cain
(74) *Attorney, Agent, or Firm* — Whyte Hirschboeck Dudek SC

(57) ABSTRACT

Use of a bimodal filler system allows masterbatches with higher filler levels to be processable. When used with moisture curable resins, the use of a masterbatch having a bimodal filler allows the preparation of a composition having a higher percentage of moisture curable resin than if a unimodal filler was used and also provides enhanced flame retardant properties.

11 Claims, No Drawings

BIMODAL FILLER SYSTEMS FOR ENHANCED FLAME RETARDANCY

CROSS-REFERENCE TO RELATED APPLICATION

This application claims the benefit of U.S. Provisional Application No, 60/975,871, filed Sep. 28, 2007, which application is fully incorporated herein by reference.

FIELD OF THE INVENTION

This invention relates generally to flame retardant polymers and specifically to such polymers containing high levels of inorganic fillers.

BACKGROUND OF THE INVENTION

Inorganic fillers are frequently used to make polymers flame retardant. However, the levels of inorganic fillers required to impart sufficient flame retardancy to the polymers result in difficult processing. Moreover, many of these fillers are mineral hydrates. Such mineral hydrates can react with moisture curable resins during storage which limits the shelf life of such resins.

The approach of loading the fillers into a masterbatch that is then coextruded with a moisture curable resin has been used to provide a moisture curable composition capable of being used to meet automotive wiring applications. This approach mitigated storage stability issues of moisture curable resin and hydrated mineral tiller compositions which prematurely crosslink. One problem with the masterbatch approach was the ability to achieve sufficient flame retardancy while still having sufficient crosslinking. The crosslinking is limited by the amount of moisture curable resin that is added to the composition. However, coextrusion with higher amounts of moisture curable resin lowers the amount of flame retardant in the final composition.

Accordingly, a moisture curable resin having high filler content and easy processability was still needed, particularly for applications requiring flame retardant polymers, such as automotive wires and cables.

BRIEF SUMMARY OF THE INVENTION

The invention improves the flame retardancy of polymer compositions through the use filler systems having a bimodal particle size distribution. Additional advantages include improved processing and improved thermophysical properties.

In one embodiment, the invention is a method for making a flame retardant composition, the method comprising coextruding a masterbatch with at least one polymer resin, wherein the masterbatch comprises at least about 70 wt %, by total weight of the masterhatch, of a bimodal filler.

In another embodiment, the invention is an intermediate for making a flame retardant moisture curable composition, the intermediate comprising a masterbatch composition comprising a polymer resin and at least about 70 wt % by weight of the total masterhatch of a bimodal filler.

The invention also includes compositions made by the inventive method; articles made from such compositions, particularly when the article is an insulated wire or cable.

DETAILED DESCRIPTION OF THE INVENTION

The current invention provides for a polymer composition having a sufficient quantity of inorganic fillers by combining a bimodal filler with a base polymer resin or resins.

The term "bimodal" as used herein means that the particle size distribution (PSD) curve exhibits two peaks wherein one peak may even exist as a hump, shoulder or tail relative to the other peak. A bimodal PSD curve can be deconvoluted into two separate PSD curves. Deconvoluting the bimodal PSD curve can be done by any convenient well-known algorithm, but is typically done by means of an appropriate computer software program.

The bimodality of the particle size distribution of the tiller composition is due to the difference in the PSD of two separate components. In other words, the bimodal filler is a composition comprising at least two components, having different average particle sizes from each other, that, when blended together, have a bimodal PSD.

Preferably, the PSD of each of the components individually is unimodal but the average particle size is different from each other such that, when mixed, the resulting composition has an overall bimodal distribution. The term "unimodal" as used herein in reference to the overall PSD of comparative examples or in reference to the PSD of a component of the inventive filler composition means the PSD curve does not substantially exhibit multiple components (i.e., no humps, shoulders or tails exist or are substantially discernible in the PSI) curve).

The filler of this invention has a bimodal particle size distribution curve that can be deconvoluted into at least two separate PSD curves that each represent at least about 10 weight percent (wt %), preferably at least about 20 wt %, more preferably at least about 30 wt %, of the filler. In some embodiments, a "bimodal PSD curve" may be deconvoluted with the freedom to fit more than two peaks. In such multimodal fillers, the multimodal PSD curve will deconvolute to have at least two separate PSD curves that fall within the above ranges.

Typically, the bimodal filler will comprise two separate components that have different particle sizes. These components can be any inorganic fillers used for flame retardancy in thermoplastic, peroxide, moisture-cured, and irradiation cured systems. In some embodiments, the two separate components could be two grades of the same material that have different average particle size. Typical inorganic flame retardant fillers include metal oxides and/or hydroxides containing aluminum, magnesium, zirconium, tin, molybdenum, and bismuth. Other flame retardant fillers include talc, calcium carbonate, organoclay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures thereof. The fillers may contain various surface coatings or treatments, such as silanes, fatty acids, and the like.

In one embodiment, two components, each with different mean particle size and substantially unimodal particle size distributions, can be blended to obtain a bimodal filler having the optimal ratio for the application. The ratio of the larger average particle size to the smaller average particle size may typically fall in the range of about 2.5:1 to about 7:1, or higher. Generally, higher ratios are expected to provide very good results but practical considerations may require using lower ratios. For instance, many fillers have an average particle size of about 1 micron, which would require the second component to have an average particle size of about 0.15 microns. Few materials are commercially available in the 0.15 particle size range, although fillers in the range of about 0.2 to about 0.4 microns are more commercially available. Alternatively, a high ratio may be achieved by using a filler with a higher average particle size, e.g., 1.5 microns, as the large particle size component.

In one, more specific, embodiment, the bimodal filler is a mixture of aluminum trihydroxide (ATH) and calcium carbonate. In mixtures of ATH and calcium carbonate, the ATH comprises between about 30 to about 90 wt %, preferably between about 50 to about 80 wt %, more preferably between about 60 to about 70 wt %, based on the total weight of the mixture. Suitable grades of ATH include, for example, MARTINAL® OL-104/LE having a nominal particle size of 1.8 microns and a surface area of 4 $m^2/g$ or Almatis HYDRAL® PGA having a nominal particle size of 1.1 microns and a surface area of 4.5 $m^2/g$.

In another specific embodiment, the ATH in the previously described embodiment may be replaced with another metal hydroxide, such as magnesium hydroxide.

The bimodal filler is mixed with at least one polymer resin to form a highly filled masterbatch. The masterbatch can be formed by any convenient melt compounding method. The masterbatch will eventually be combined with at least one base polymer resin. Therefore, the masterbatch resin should be compatible with the base resin, or a compatiblizer should be used. The masterbatch resin should also have a sufficiently high melt index so as to allow the highly filled masterbatch to be melt processable through an extruder or melt mixer. Melt mixers useful for this process include internal mixers (e.g., mixers from Banbury) or co-kneading mixers (e.g., Buss mixers). Preferably, the resin used in the masterbatch provides a masterbatch rheology that is similar to the rheology of the resins coextruded to make the final product. One suitable masterbatch resin for use with polyolefin base resins is an LLDPE resin with a melt index of around 30. The masterbatch should comprise at least about 70 wt %, more preferably at least about 85 wt %, filler, based on the total weight of the masterbatch.

The highly filled masterbatch is coextruded or melt mixed with the base polymer resin to form a highly filled flame retardant composition. Such coextrusion and melt mixing methods have long been well-known in the art.

The base polymer resin may be any thermoplastic, peroxide crosslinkable, radiation curable, or moisture crosslinkable polymers. Non-limiting examples of such polymers include polyolefins (including those listed in WO2006026256), polyamides, polystyrenes, acrylic resins, polyvinyl chlorides, polyurethanes, polyesters, or such polymers further comprising silane functional groups, epoxy functional groups, or other functional groups that will react to crosslink the polymer resin in the presence of water. This invention can be especially advantageous with polymers containing moisture crosslinkable functional groups.

Moisture curable polymers with silane functional groups are well-known in the field. Such polymers can be made either by copolymerization with a vinyl silane monomer or by one of many methods for grafting a silane-containing molecule to the backbone of a polymer chain. Examples of such techniques are disclosed in U.S. Pat. Nos. 3,646,155; 6,420,485; 6,331,597; 3,225,018; or 4,574,133, all of which are incorporated herein by reference. Polymers with silane functional groups are also commercially available, for example, Si-Link™ ethylene-vinyltrimethoxysilane copolymers available from Dow Chemical Co.

The silylated copolymers of the present invention may be cured by contact with, or exposure to, water (moisture), preferably in the presence of a condensation catalyst. Suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids. Preferred catalysts are organic tin compounds such as dibutyltin dilaurate, dibutyl dimethoxy tin, dibutyltin bis(2,4-pentanedionate) and stannous octoate. The amount of catalyst sufficient to cure the silylated copolymer will generally depend on the specific type selected but will preferably range from about 0.1 to 10 parts by weight per 100 parts by weight of the grafted copolymer.

Coextrusion with a masterbatch is especially useful in combination with a moisture curable base polymer resin. Masterbatches containing the flame retardant fillers are frequently used with moisture curable resins because many of the fillers, especially the metal hydroxides, will react with the moisture curable resin to prematurely crosslink the resin and reduce the shelf life of the resin. However, the total loading requirement to achieve acceptable fire retardance in the final composition puts a significant burden on the overall amount of filler required in the masterbatch approach. Using bimodal filler mixtures allow higher loadings of filler in the masterbatch which allowed coextrusion with higher content of moisture curable resin. The final composition does not require as much of the higher loaded masterbatch, which provides a higher crosslinking density due to the presence of more of the curable resin. The higher crosslinking density provides improvements in thermophysical properties such as hot deformation at 150° C.

The bimodal filler concept is also useful for non-moisture curable systems, e.g., thermoplastic, peroxide, and irradiation cured systems. For these systems, highly filled masterbatches may still be used, but might not be necessary. Rather, bimodal filler may be directly melt compounded into the base polymer resin to yield final compositions comprising bimodal mixtures. Whether or not a masterbatch process is used, the resulting final composition still has the advantage of improved flame retardancy.

Either the masterbatch and/or the base polymer resin can contain other additives such as antioxidants, surface treatments, crosslinking catalysts, or additional flame retardants. Such additives can include, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), UV absorbers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides, free-radical initiators, or silanes), moisture cure catalysts (such as dibutyltindilaurate or distannoxanes), colorants or pigments to the extent that they do not interfere with desired physical or mechanical properties of the compositions of the present invention, and other flame retardant additives, such as halogenated organic compounds. Halogenated organic compounds including halogenated hydrocarbons such as chlorinated paraffin, halogenated aromatic compounds such as pentabromotoluene, decabromodiphenyl oxide, decabromodiphenylethane, ethylene-bis(tetrabromophthaiimide), DECHLORANE PLUS™, and other halogen-containing flame retardants. One skilled in the art would recognize and select the appropriate halogen agent depending on the desired performance of the composition. The above additives are employed in functionally equivalent amounts known to those skilled in the art, generally in amounts of up to about 65 wt %, based upon the total weight of the composition.

The compositions of the present invention can be processed to fabricated articles by any suitable means known in the art. For example, the compositions can be processed to films or sheets or to one or more layers of a multilayered structure by known processes, such as calendering, blowing, casting or (co-)extrusion processes. Injection molded, compression molded, extruded or blow molded parts can also be prepared from the compositions of the present invention. Alternatively, the compositions can be processed to foams or fibers. In particular, the composition is useful in making jackets for cables or wires.

EXAMPLES

Three masterbatches A, B, and C were made with the formulas shown in Table 1. Masterbatch A comprise 70 wt % of Alcoa PGA SD, an aluminum trihydroxide now available from Almatis and having a nominal particle size of 1.1 microns and a surface area of 4.5 m$^2$/g. Masterbatch B comprises 70 wt % of MARTINAL OL-104/LE an aluminum trihydroxide having a nominal particle size of 1.8 microns and a surface area of 4 m$^2$/g. Masterbatch C comprise 85 wt % of a hi-modal filler. The bimodal filler was an approximately 2:1 weight ratio of MARTINAL OL-104/LE ATH and MULTIFEX-MM which is a precipitated calcium carbonate sold by Specialty Minerals having a particle size of 0.07 microns and a surface area of 23 m$^2$/g. All of the masterbatches comprised antioxidants distearylthiodiprionate (DSTDP) and IRGANOX™ 1010FF and were compounded in a 30 g/10 min. melt index, polyethylene having a nominal density of 0.902 g/cm$^3$ available from the Dow Chemical Company. The compounding temperatures and torques are also shown in Table 1.

Masterbatches of an ATH at 70 wt % filler and a masterbatch at 85 wt % filler made with a bimodal filler mixture of ATH and CaCO$_3$ where the ratio of ATH:CaCO$_3$ was approximately 2:1. Despite having 15 wt % additional filler, torque values for masterbatch C (85 wt % filler) were similar to masterbatch A (70 wt % filler).

These masterbatches were coextruded with a 1.5 g/10 min. MI ethylene-co-vinyl trimethoxysilane (VTMS) copolymer containing 1.5 wt % VMS and sold by the Dow Chemical Company as SI-LINK™, and catalyst masterbatch to obtain compositions with 50 wt % filler. The higher filler masterbatch allows incorporation of 39.2% VTMS copolymer (Ex. 1) while only 26.8% VTMS copolymer can be extruded with the lower filler masterbatch (CS1 and CS2), See Table 2. Insulated wires were made (78 mil, total diameter over 18AWG). The wire was produced using a ¾ inch Brabender extruder equipped with a PE metering screw. A temperature profile of 130 C/150 C/170° C. on the barrel zones was used with a die temperature setpoint of 170° C. A 16 mil thick jacket was made on 18 AWG standard copper wire using a die with an inner diameter of 0.053 inch and an outer diameter of 0.076 inch. The insulated wire was cured in a water bath at 90° C. for 4 hours. The insulated wire made with the filler masterbatch containing the bimodal filler (Ex. 1) resulted in lower decalin extractables and UL-44 deformation at 150° C. This result is anticipated because the system (Ex. 1) contains more crosslinkable resin. Unexpectedly, burn performance as measured by J-1128 and MS-8288 were best for the formulation having a bimodal particle size distribution (Ex. 1) despite the fact that 33% of the filler system is a passive flame retardant (calcium carbonate) as compared to the other filler systems which are 100% ATH (CS1 and CS2).

TABLE 1

Bimodal Filler Masterbatch Formulas

| | Component | Comment | Density | A | B | C |
|---|---|---|---|---|---|---|
| 1 | Polyethylene | 30 g/10 min. | 0.902 g/cm$^3$ | 27.0 | 27.0 | 11.0 |
| 2 | Alcoa PGA SD White | ATH | 2.4 | 70.0 | 0.0 | 0.0 |
| 3 | MARTINAL OL-104/LE | ATH | 2.4 | 0.0 | 70.0 | 56.0 |
| 4 | MULTIFEX-MM | CaCO3 | 2.77 | 0.0 | 0.0 | 29.0 |
| 5 | Industrene 5016 | Stearic Acid | 1.03 | 0.0 | 0.0 | 1.00 |
| 6 | Distearylthiodiprionate (DSTDP) | Antioxidant | 1.05 | 2.0 | 2.0 | 2.0 |
| 7 | IRGANOX 1010FF | Antioxidant | 1.15 | 1.0 | 1.0 | 1.0 |
| | | | | 100.0 | 100.0 | 100.0 |
| | | Density | calc. | 1.62 | 1.62 | 2.03 |
| | | Temperature | (° C.) | 175 | 155 | 175 |
| | | Torque | mg | 15000 | 9000 | 19000 |

TABLE 2

Wire Extrusion of High Filler Masterbatches in Automotive Moisture - Curable Flame Retardant System

| Comment | Comparative Sample CS1 | Comparative Sample CS2 | Example Ex. 1 |
|---|---|---|---|
| Masterbatch A (70% filler) | 71.5 | 0.0 | 0.0 |
| Masterbatch B (70% filler) | 0.0 | 71.5 | 0.0 |
| Masterbatch C (85% filler) | 0.0 | 0.0 | 59.0 |
| SI-LINK ™ | 26.8 | 26.8 | 39.2 |
| Catalyst Masterbatch | 1.8 | 1.8 | 1.8 |
| Total | 100.0 | 100.0 | 100.0 |
| MELT TEMPERATURE, ° C. | 169 | 169 | 169 |
| HEAD PRESSURE | 5270 | 5060 | 7230 |
| RPM | 58 | 58 | 60 |
| AMPS | 4.5 | 5 | 5 |
| Decalin Extractables, wt % | 30.5 | 30.2 | 18.7 |
| UL-44 Deformation @ 150° C. | 37.5 | 36.4 | 25 |
| Flame - MS-8288, secs | 15 | 13 | 7 |
| Flame - J-1128, secs | >180 | 111 | 10 |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wire or cable insulation layer or jacket comprising a flame retardant composition, the composition made by a method comprising coextruding a masterbatch with at least one polymer resin, wherein the masterbatch comprises at least 85 wt %, by total weight of the masterbatch, of a bimodal filler characterized by an average particle size distribution curve of two peaks of which one peak represents large particles and one peak represents small particles and the ratio of large average particle size to small average particle size is 2.5:1 to 7:1.

2. The wire or cable insulation layer or jacket of claim 1 wherein each peak of the bimodal filler represents at least 10 wt % of the bimodal filler.

3. The wire or cable insulation layer or jacket of claim 1 wherein the filler comprises at least one flame retardant.

4. The wire or cable insulation layer or jacket of claim 3 wherein the flame retardant is a metal hydrate.

5. The wire or cable insulation layer or jacket of claim 1 wherein the bimodal filler comprises aluminum trihydroxide and calcium carbonate and wherein the aluminum trihydroxide and the calcium carbonate each have different particle sizes.

6. The wire or cable insulation layer or jacket of claim 5 wherein the aluminum trihydroxide comprises about 30 to about 90 wt % of the bimodal filler.

7. The wire or cable insulation layer or jacket of claim 1 wherein the bimodal filler comprises magnesium hydroxide and calcium carbonate and wherein the magnesium hydroxide and the calcium carbonate each have different particle sizes.

8. The wire or cable insulation layer or jacket of claim 7 wherein the magnesium hydroxide comprises about 30 to about 90 wt % of the bimodal filler.

9. The wire or cable insulation layer or jacket of claim 1 in which the polymer resin is at least one of a thermoplastic, peroxide crosslinkable, radiation curable, or moisture crosslinkable polymer resin.

10. The wire or cable insulation layer or jacket of claim 9 wherein the polymer resin is at least one of polyolefin, polyamide, polystyrene, acrylic resin, polyvinyl chloride.

11. The wire or cable insulation layer or jacket of claim 1 wherein the masterbatch is coextruded with at least one polymer resin and a ratio sufficient to result in a flame retardant composition comprising at least 50% bimodal filler.

* * * * *